United States Patent [19]
Butterworth

[11] Patent Number: 5,929,999
[45] Date of Patent: Jul. 27, 1999

[54] LIGHT SOURCE FOR TRISTIMULUS COLORIMETRY

[75] Inventor: Mark M. Butterworth, Santa Clara, Calif.

[73] Assignee: Hewlett-Packard Company, Palo Alto, Calif.

[21] Appl. No.: 09/144,876

[22] Filed: Sep. 1, 1998

[51] Int. Cl.$^6$ ........................................................ G01J 3/50
[52] U.S. Cl. ........................ 356/405; 356/406; 250/226; 358/509
[58] Field of Search ........................................... 356/402, 405, 356/406, 407, 420; 250/226; 358/509; 362/84, 800

[56] References Cited

U.S. PATENT DOCUMENTS

| | | | |
|---|---|---|---|
| 4,678,338 | 7/1987 | Kitta et al. | 356/420 |
| 5,137,364 | 8/1992 | McCarthy | 356/402 |
| 5,157,465 | 10/1992 | Kronberg | 356/405 |
| 5,272,518 | 12/1993 | Vincent | 356/405 |
| 5,671,059 | 9/1997 | Vincent | 356/402 |
| 5,747,832 | 5/1998 | Nakamura et al. | 257/103 |
| 5,753,906 | 5/1998 | Gennetten | 250/226 |

*Primary Examiner*—F. L. Evans

[57] ABSTRACT

A light source used to measure color involves associating a light emitter that emits light having a first spectral distribution with a wavelength-shifting medium that absorbs the emitted light and re-emits the light at a second spectral distribution that approximates one of the three color curves of the CIE standard X, Y, and Z tristimulus functions. Preferably, the light source involves associating known blue light sources with a green-converting lens and a red-converting lens where materials integrated into the lenses, preferably fluorescent organic dyes, absorb the blue light and re-emit green and red light respectively. The blue light, the converted green light, and the converted red light, are generated to closely match the CIE standard X, Y, and Z tristimulus functions in order to measure color in a manner that correlates to the color sensitivity of the human eye. The blue light used to generate the blue, green, and red light is preferably generated from Galium Nitride based LEDs that are encased in epoxy lenses. The flourescent organic dyes used to create the green and red light are mixed into the epoxy lenses that encapsulate the respective blue light emitting LEDs.

20 Claims, 7 Drawing Sheets

LIGHT SOURCE FOR TRISTIMULUS COLORIMETRY

TECHNICAL FIELD

The invention relates to a device for measuring color and more particularly to a light source used in a calorimeter.

BACKGROUND ART

Colorimeters are often used to determine the color of an existing object, such as a paint sample, so that the color can be reproduced. In order to reproduce color so that it appears as a duplication to the human eye, a light source used during the process of measuring color must correlate to the spectral sensitivity of the human eye. As is well known, a human eye has three different kinds of color receptors (cones) that are sensitive to various spectral bands or regions that roughly correspond to red, green, and blue light. The receptors are relatively "broadband" devices, sensitive to a wide range of wavelengths within each color band region. For example, as shown by the solid line curves 12, 14, and 16 in FIG. 1, blue receptors are typically sensitive to light having wavelengths ranging from about 400 nm to 500 nm (curve 12); green receptors are sensitive to light having wavelengths ranging from about 480 nm to 630 nm (curve 14); and red receptors are sensitive to light having wavelengths ranging from about 500 nm to 660 nm (curve 16). While the specific sensitivities of the color receptors vary from person-to-person, the average response for each receptor has been quantified and is known as the "CIE standard observer." The three intensity-versus-wavelength curves are referred to as the CIE standard X, Y, and Z tristimulus functions where the X function curve 16 relates to red light, the Y function curve 14 relates to green light, and the Z function curve 12 relates to blue light.

Accurately reproducing colors in a tristimulus system is accomplished by ensuring that the light sources used to illuminate the desired object have spectral bands or ranges that match as closely as possible to the spectral response ranges of the three receptors (i.e., red, green, and blue) in the human eye. Since the receptors of the human eye are sensitive to a relatively broad spectral range of light colors, the light sources used in colorimeter devices must have similar broad spectral ranges if accurate color reproduction is to be achieved.

Many techniques, including light separation and light filtering, have been implemented in colorimeters to generate light that tracks the tristimulus values of the human eye. In the light separation technique, polychromatic light (usually white light) is separated into multiple color component beams, each of which is then focused onto a dedicated photo sensor. For example, a single light source is split using an optical prism into red, green, and blue color component portions which are then simultaneously projected onto three separate linear photo sensors. The output from each photo sensor represents the tristimulus value for the corresponding primary color. Although this technique works well for its intended purpose, the separation of the initial light source requires optical devices that add cost to a calorimeter.

With regard to the light filtering technique, polychromatic light (usually white light) is projected onto a sample and then the light that reflects from the sample is divided into three substantially identical beams. Each of the three reflected beams is then passed through one of a blue, green, or red filter/photo sensor combination. Within the filter/photo sensor combination through which a reflected beam is passed, the beam is filtered by a color-specific filter in order to obtain the respective one of the three tristimulus values as an output of the photo sensor. Although this technique works well for its intended purpose, the filtering of light requires additional optical devices to be integrated into a colorimeter for carrying out the light filtering. In addition, filters used to mimic tristimulus values may not closely match the actual X, Y, and Z tristimulus functions.

As an alternative to utilizing polychromatic light sources and manipulating light to coincide with the CIE standard X, Y, and Z tristimulus functions, colored LEDs have been used to generate red, green, and blue light. Traditionally, LEDs have efficiently generated red light, with green and blue light being generated by doping LEDs to shift the emitted wavelength. Doping of LEDs has generated poor results when trying to match the broadband intensity-versus-wavelength curves of the CIE standard X, Y, and Z tristimulus functions. The dashed line curves 22, 24, and 26 of FIG. 1 show how typical doped LEDs match up with the established CIE standard X, Y, and Z tristimulus functions. As can be seen, the closest match between corresponding curves is between the blue light LED curve 22 and the Z tristimulus function curve 12, while the green and red light LED curves 24 and 26 and the Y and X tristimulus function curves 14 and 16, respectively, are less closely matched. Unfortunately, it is difficult to fabricate light sources and/or filters having broadband spectral ranges that can closely approximate those of human receptors, much less provide an identical match.

In another approach, instead of trying to dope LEDs to match the CIE standard X, Y, and Z tristimulus functions, LEDs generating light over a broad range of wavelengths are mixed to try to match the desired intensity curves. Mixing of light from LEDs requires additional systems that are not necessary if the LEDs are able to generate light with spectral distributions that initially match the CIE standard X, Y, and Z tristimulus functions.

In view of the shortcomings involved with manipulating light to match the CIE standard X, Y, and Z tristimulus functions, what is needed is a light source that more closely matches the CIE standard X, Y, and Z tristimulus functions, with the light source being of the type that can be integrated into a calorimeter so that color can be measured in a manner that better correlates to the color sensitivity of the human eye.

SUMMARY OF THE INVENTION

An apparatus and method for generating light used to measure color involve associating a light emitter that emits light having a first spectral distribution with a wavelength-shifting medium that absorbs the emitted light and re-emits the light at a second spectral distribution, where the second spectral distribution approximates one of the three color curves of the CIE standard X, Y, and Z tristimulus functions. Preferably, the apparatus and method for generating light used to measure color involve associating known blue light sources with a green-converting medium lens and a red-converting medium, where materials integrated into the mediums, preferably fluorescent organic dyes, absorb the blue light and re-emit green and red light respectively. The blue light, the converted green light, and the converted red light are generated to closely match the CIE standard X, Y, and Z tristimulus functions in order to measure color in a manner that correlates to the color sensitivity of the human eye. The blue light is preferably emitted from a Galium Nitride (GaN) based LED in a spectral distribution that closely corresponds to the CIE standard Z tristimulus function. The blue LED is encased in an epoxy lens that focuses the blue light but does not alter the wavelength of the emitted blue light. The green light is preferably generated from another blue light emitting GaN-based LED, where the LED is encased in an epoxy lens that has been mixed with a green-converting fluorescent organic dye. Blue light emitted from this second LED is absorbed by the fluorescent organic dye in the lens and re-emitted as green light that closely corresponds to the CIE standard Y tristimulus function. The change of light color is accomplished through fluorescence, a process whereby short wavelength light is absorbed and re-emitted as longer wavelength light. The red light is preferably generated from another blue light emitting GaN-based LED, where the LED is encased in an epoxy lens that has been mixed with a red-converting fluorescent organic dye. Blue light emitted from this third LED is absorbed by the fluorescent organic dye in the lens and re-emitted as red light that closely corresponds to the X tristimulus function.

In a preferred embodiment of the invention, the blue, green, and red light emitters are combined with at least one photo detector to form a colorimeter that measures the color of objects utilizing light beams that have broad band spectral ranges which more closely simulate the ranges of human eye receptors. In operation, three light emitters in the colorimeter systematically generate their respective colored light and direct the light onto the object of interest. Portions of the light directed onto the object of interest are reflected from the object and detected by the photo detector. Based on the intensities of light that are detected by the photo detector, color measurements of the object are determined.

Some alternative embodiments include providing a single color light source, such as a green light source that approximates the spectral distribution of the CIE Y tristimulus function curve. Green light generated through wavelength shifting as described above can be used to measure brightness or darkness. In another embodiment, the light source can emit light that approximates two of the X, Y, or Z tristimulus function curves. A two-color light source emitting, for example, red and green light can be used to sort items such as red and green apples.

As is apparent to one of ordinary skill in the art, a calorimeter in accordance with the invention can be integrated into other color sensitive devices, such as a color scanner. Another preferred embodiment of the invention includes integrating the blue, green, and red light emitters as described above into a color scanner in order to scan color images in a manner that better correlates with the color sensitivity of the human eye. In operation, three light emitters such as the emitters described above are arranged such that they can direct light into a glass light bar. Light in the glass light bar is then directed onto an image that is to be scanned. Portions of the light that are directed onto the image reflect from the image and the intensities of the reflected light portions are detected by a photo sensor array that is part of the scanner. The photo sensor array transforms the light energy into electrical signals that are then transformed into color image data representative of the scanned object.

An advantage of the invention is that the three light emitters generate light that correlates to the CIE standard X, Y, and Z tristimulus functions more closely than other known illumination techniques. In addition, a colorimeter formed with the above described light emitters does not require the additional optical devices which are required for light separation and light filtering. Finally, utilizing organic dyes in an epoxy lens to convert blue light to green light and red light produces a stable broad band light source that is consistent over extended periods of time.

DETAILED DESCRIPTION

The light source of the preferred embodiment of the invention includes three light emitters, where each one of the light emitters outputs light corresponding to a different curve of the CIE standard X, Y, and Z tristimulus functions. The lights that correspond to the three tristimulus functions are referred to hereinafter as blue, green, and red light, where the blue light corresponds to the CIE standard Z tristimulus function, the green light corresponds to the CIE standard Y tristimulus function, and the red light corresponds to the CIE standard X tristimulus function. The blue, green, and red light emitters are described first and the incorporation of the light emitters into a calorimeter is discussed subsequently.

Figure 2:
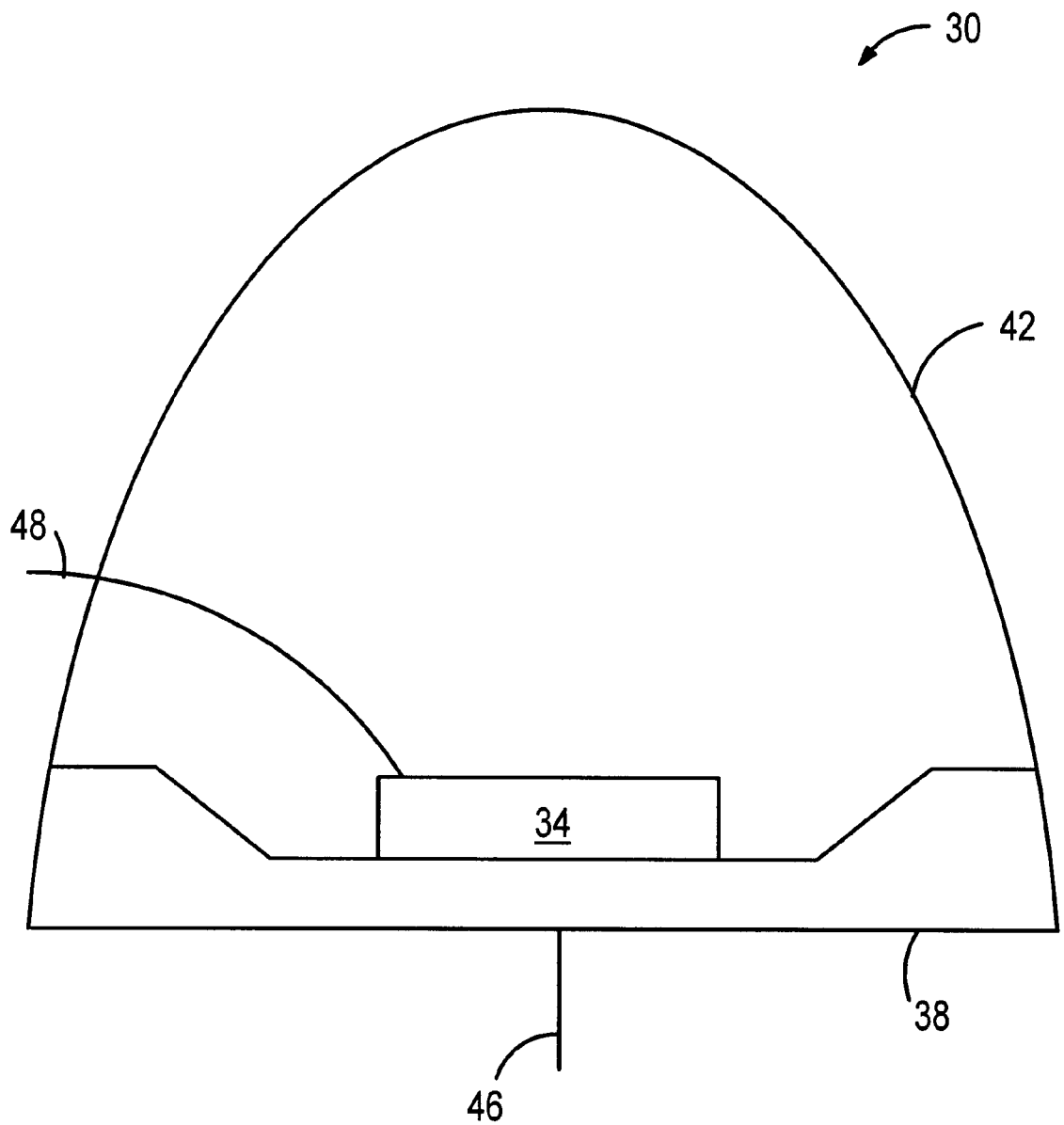
FIG. 2 is a diagram of a blue light emitting diode that is incorporated into a colorimeter in accordance with the invention.

FIG. 2 is a diagram of a light emitting diode (LED) 30 that emits blue light. The LED includes a blue light emitting Galium Nitride (GaN) die 34, a reflector cup lead frame 38, an epoxy lens 42, and two leads 46 and 48. The GaN die is a light emitting GaN-based compound semiconductor device, such as a device discussed by Nakamura et al. in U.S. Pat. No. 5,747,832, that emits blue light in the range of 450 nm to 490 nm. The GaN die is attached and wire bonded to the reflector cup lead frame. Power is provided to the GaN die by the two leads 46 and 48 and the die is overmolded or encapsulated with a clear epoxy lens. The clear epoxy lens focuses the blue light that is emitted from the die but does not significantly change the range of wavelengths of the emitted light, although focusing of the emitted light is not critical to the invention. When power is applied to the die through the leads, the die emits blue light onto a desired object.

Figure 3:
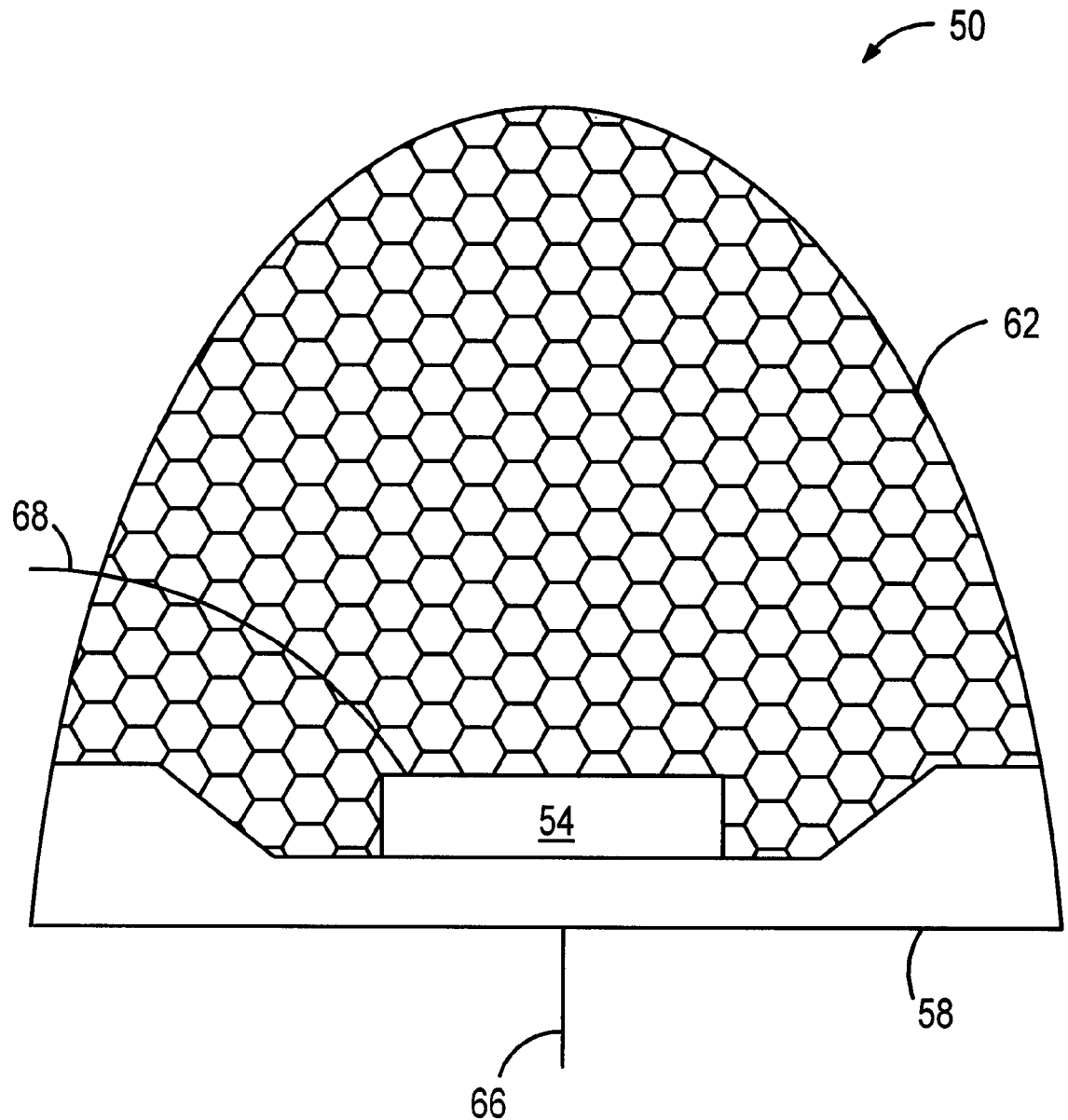
FIG. 3 is a diagram of a green or red light emitting diode that is incorporated into a colorimeter in accordance with the invention.

FIG. 3 is a diagram of a light emitting diode 50 that emits green or red light. The LED of FIG. 3 includes a GaN die 54, a reflector cup lead frame 58, and two leads 66 and 68 similar to the LED of FIG. 2, except that the LED includes a lightwave converting medium material, preferably fluorescent organic dye, that is added to an epoxy lens 62 and which is described in the U.S. patent application with Ser. No. 08/892,049, now U.S. Pat. No. 5,847,507, which is assigned to the assignee of the present invention. The fluorescent organic dye added to the epoxy lens causes the blue light emitted from the GaN die to be absorbed by the dye and re-emitted at a different wavelength. The shifting of wavelengths is accomplished through fluorescence, a process whereby short wavelength light is absorbed and re-emitted as longer wavelength light. The re-emitted wavelength is dependent on the type and concentration of dye that is mixed into the epoxy lens. Although in the preferred embodiment the lightwave converting medium is integrated into a lens, the lightwave converting medium could be integrated into a non-focusing encapsulation such as a flat encapsulation.

To create a green LED that closely matches the CIE standard Y tristimulus function, the following fluorescent organic materials from Lambda Physik, Inc., Fort Lauderdale, Fla., have been excited with a 470 nm blue GaN LED:

Coumarin 6

Fluorol 7GA

DOCI.

Other examples of possible non-organic fluorescent materials that may be used to generate green light include the following phosphors from Osram Sylvania, Inc., Danvers, Mass.:

Type 1261 CuAuAI:ZnS

Type 1260 CuAI:ZnS

Type 251 Ce:YAG.

To create a red LED that closely matches the CIE standard X tristimulus function, the following fluorescent organic materials, also from Lambda Physiks, Inc., have been excited with a 470 nm blue LED:

DCM

DCM Special

Pyridine 1

Pyridine 2.

Another example of a possible non-organic fluorescent material that may be used to generate red light includes a phosphor from Osram Sylvania, Inc. referred to as Type 236 Mg4(F)GeO5:Mn.

Still other appropriate dyes that may be used for generating green or red light include the multiple transfer organic dyes from Molecular Probes Inc., Eugene, Oreg.

The use of fluorescent organic dyes appears to be more efficient than the use of inorganic materials as an additive to the epoxy lens 62 to shift the wavelength of light emitted from a blue LED. Inorganic dyes are typically powders, whereas organic dyes are typically liquids. When integrated into the epoxy lens covering a blue LED, powder particles from inorganic dyes can block or scatter some of the emitted light. However, liquid fluorescent organic dyes mixed with epoxy create non-scattering, or non-blocking, lenses.

Figure 1:
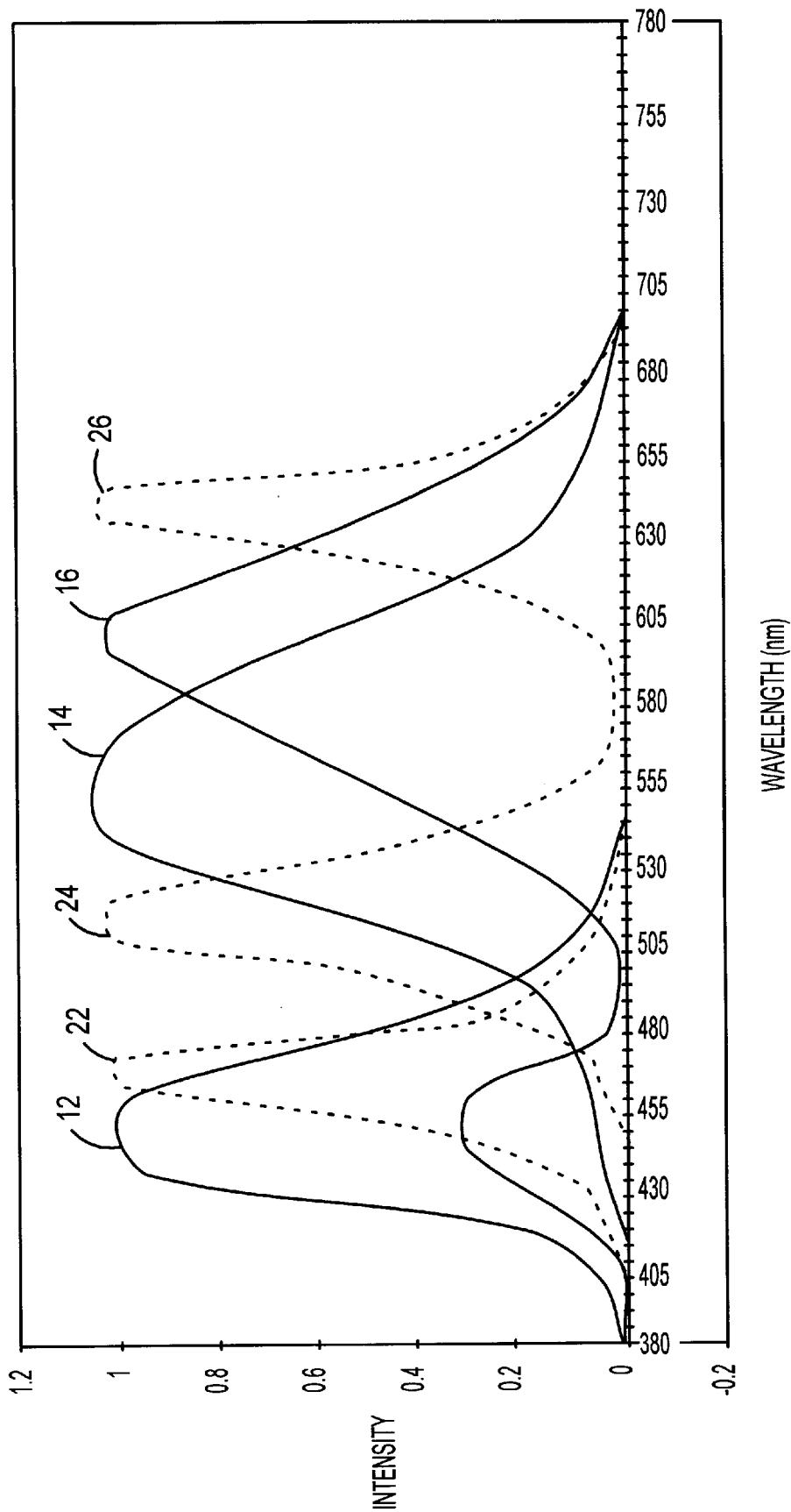
FIG. 1 is an intensity-versus-wavelength graph of the X, Y, and Z tristimulus functions as compared to the intensity curves generated by prior art LEDs that have been doped to shift their emitted wavelength.
Figure 4:
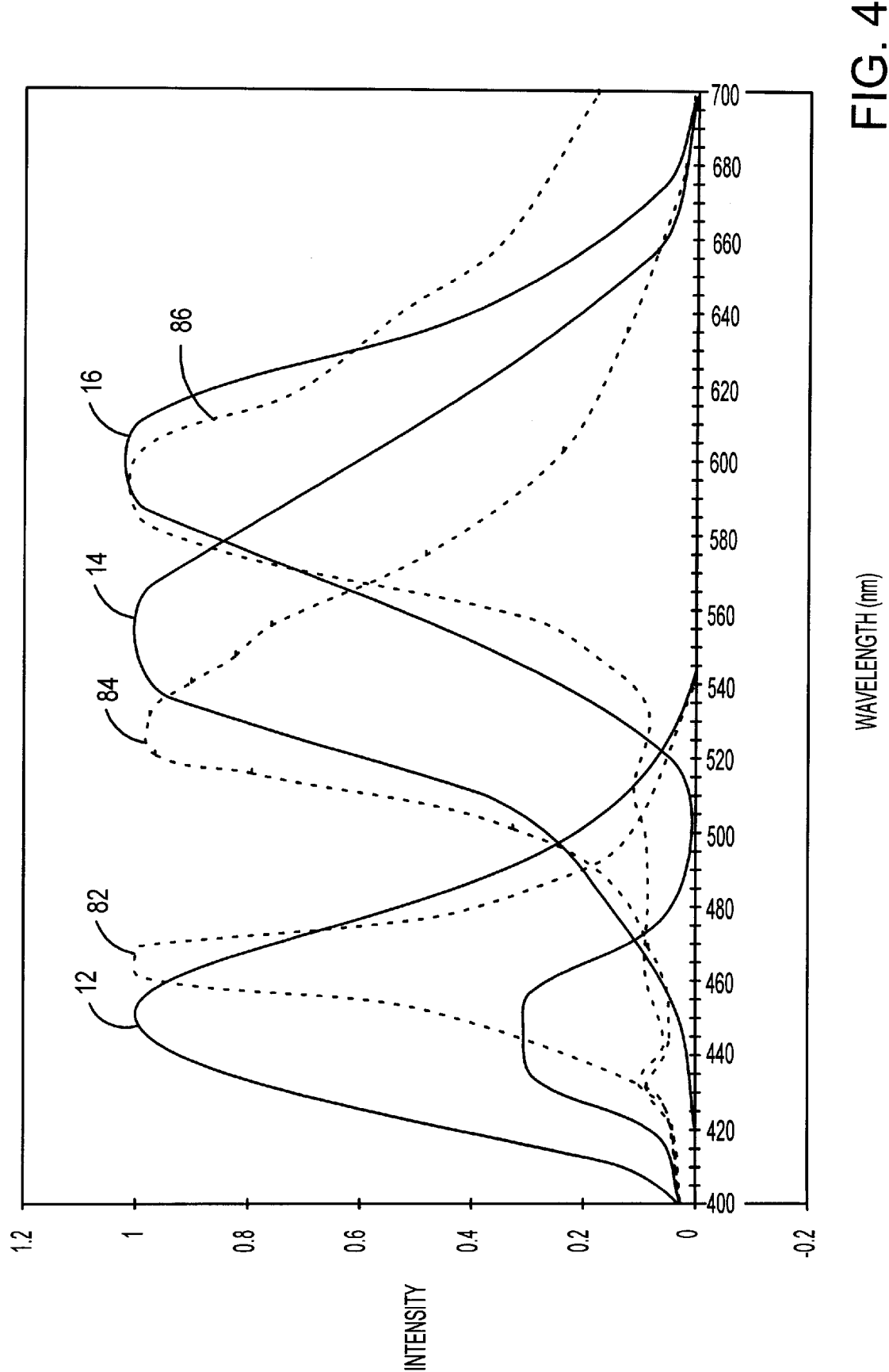
FIG. 4 is an intensity-versus-wavelength graph of the X, Y, and Z tristimulus functions as compared to the intensity curves generated by three the LEDs that generate the three tristimulus colors in accordance with the invention.

FIG. 4 is an intensity-versus-wavelength graph of the CIE standard X, Y, and Z tristimulus function curves 12, 14, and 16 as compared to the intensity curves generated by the blue LED and the green and red emitters that have fluorescent organic dye integrated into their epoxy lens. As can be seen, the blue light curve 82 generated from the blue LED approximates the CIE standard Z tristimulus function curve 12, essentially the same as the blue light curve 22 depicted in FIG. 1. In contrast, the green light curve 84 and the red light curve 86 generated by the respective blue LED/organic dye combinations have spectral distributions that match up much closer to the CIE standard Y and X tristimulus function curves 14 and 16 than the spectral distribution of the green and red light curves 24 and 26 as shown in FIG. 1. Because the light generated from the blue LED and the two blue LED/fluorescent organic dye combinations match the CIE standard X, Y, and Z tristimulus functions better than other conventional LED techniques, color can be measured and reproduced in a manner that better correlates with the human eye.

Figure 5:
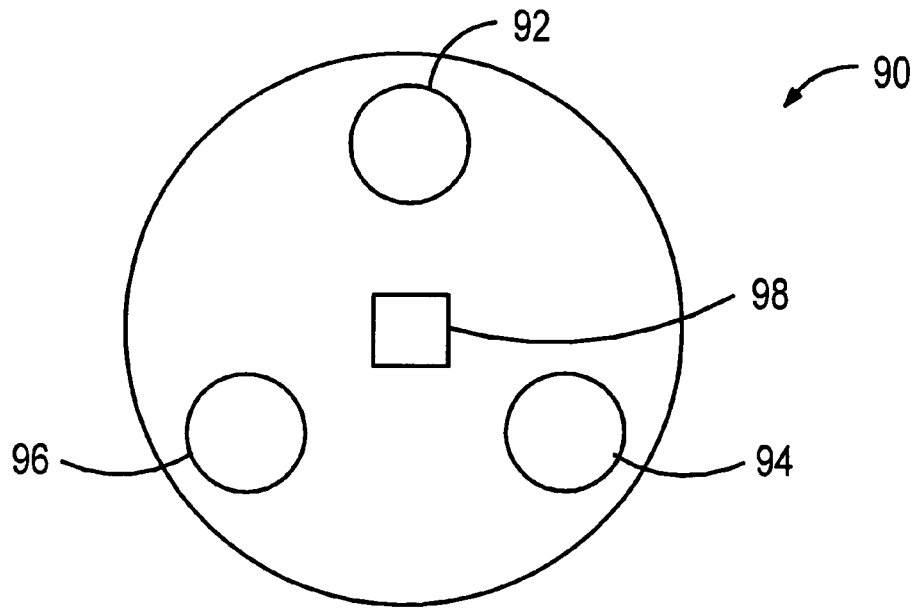
FIG. 5 is a plan view of a colorimeter that utilizes three LEDs that generate light closely matching the X, Y, and Z tristimulus functions in accordance with the invention.
Figure 6:
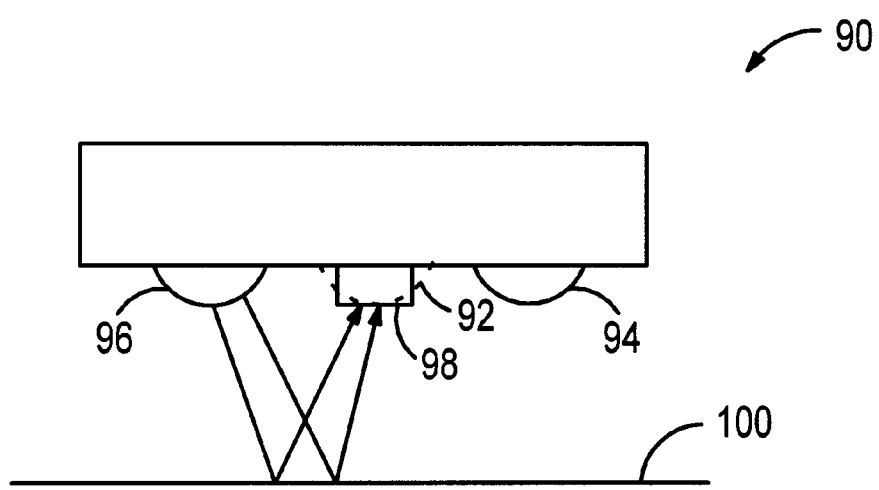
FIG. 6 is a side view of the calorimeter of FIG. 5 that utilizes three LEDs that generate light closely matching the X, Y, and Z tristimulus functions in accordance with the invention.

FIG. 5 is a depiction of how the three-color light source is combined with a photo detector to form a colorimeter 90 in accordance with the invention. In a preferred embodiment, the calorimeter has a blue light emitter 92, a green light emitter 94, and a red light emitter 96 evenly distributed around a photo detector 98, where the light emitters generate colored light as described above. Also in the preferred embodiment, as shown by the side view of the colorimeter 90 in FIG. 6, light generated from the light emitters is directed towards an object 100 whose color or color pattern is to be measured. In order to accurately measure color, the three colored lights are directed towards the object one at a time in a rotating fashion. The photo detector 98 receives light that is reflected from the object and then a calorimeter computer system (not shown) determines the corresponding X, Y, and Z tristimulus function values based on the light that is detected by the photo detector. Although the calorimeter is shown as having only three light emitters and one photo detector, other arrangements can be implemented. For example, the blue, green, and red light emitters may be formed from a single LED or multiple LEDs and more than one photo detector can be used to detect the reflected light.

Figure 7:
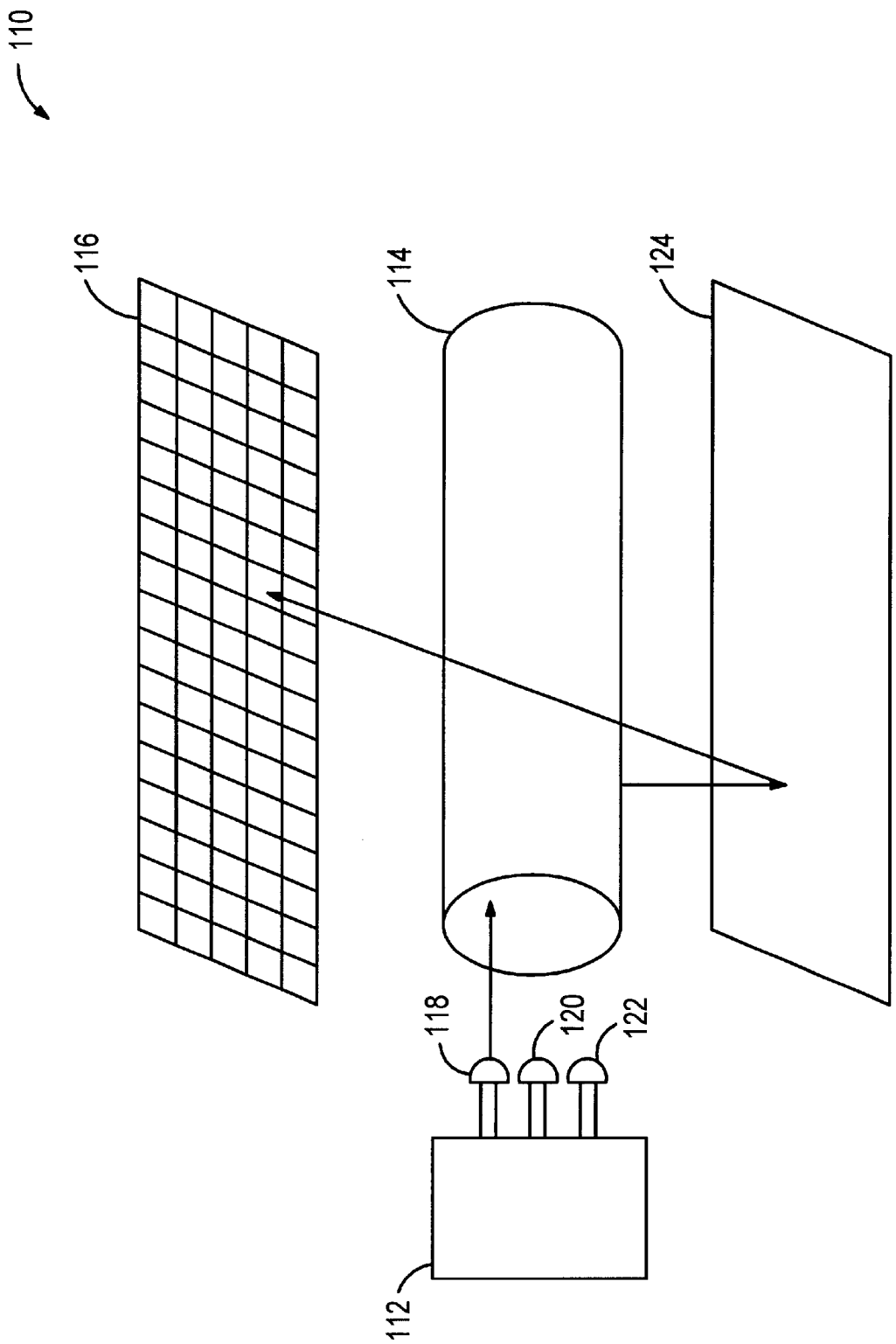
FIG. 7 is a depiction of a color scanner that utilizes three LEDs that generate light closely matching the X, Y, and Z tristimulus functions in accordance with the invention.

A colorimeter utilizing a three-color light source as described above can also be integrated into other color-sensitive devices, such as a color scanner. FIG. 7 is a depiction of a color scanner 110 that utilizes a three-color light source 112 in conjunction with a transparent light dispersion bar 114 and a photo sensor array 116 to measure color and to scan an image. In the preferred embodiment, light from three light emitters is successively directed into the end of the transparent light dispersion bar, where three light emitters 118, 120, and 122 generate blue, green, and red lights that simulate the CIE standard X, Y, and Z tristimulus functions as described above. Once inside the glass bar, the colored light from the three emitters is directed onto an object 124 containing an image that is to be scanned. After contacting the object that contains the image, some portion of the light is reflected from the object and detected by the photo detector array. The photo detector array transforms the light energy related to each successive color into electrical signals that are transformed into color image data by a scanner computer system (not shown). The electrical signals represent the color and image data of the scanned object.

Figure 8:
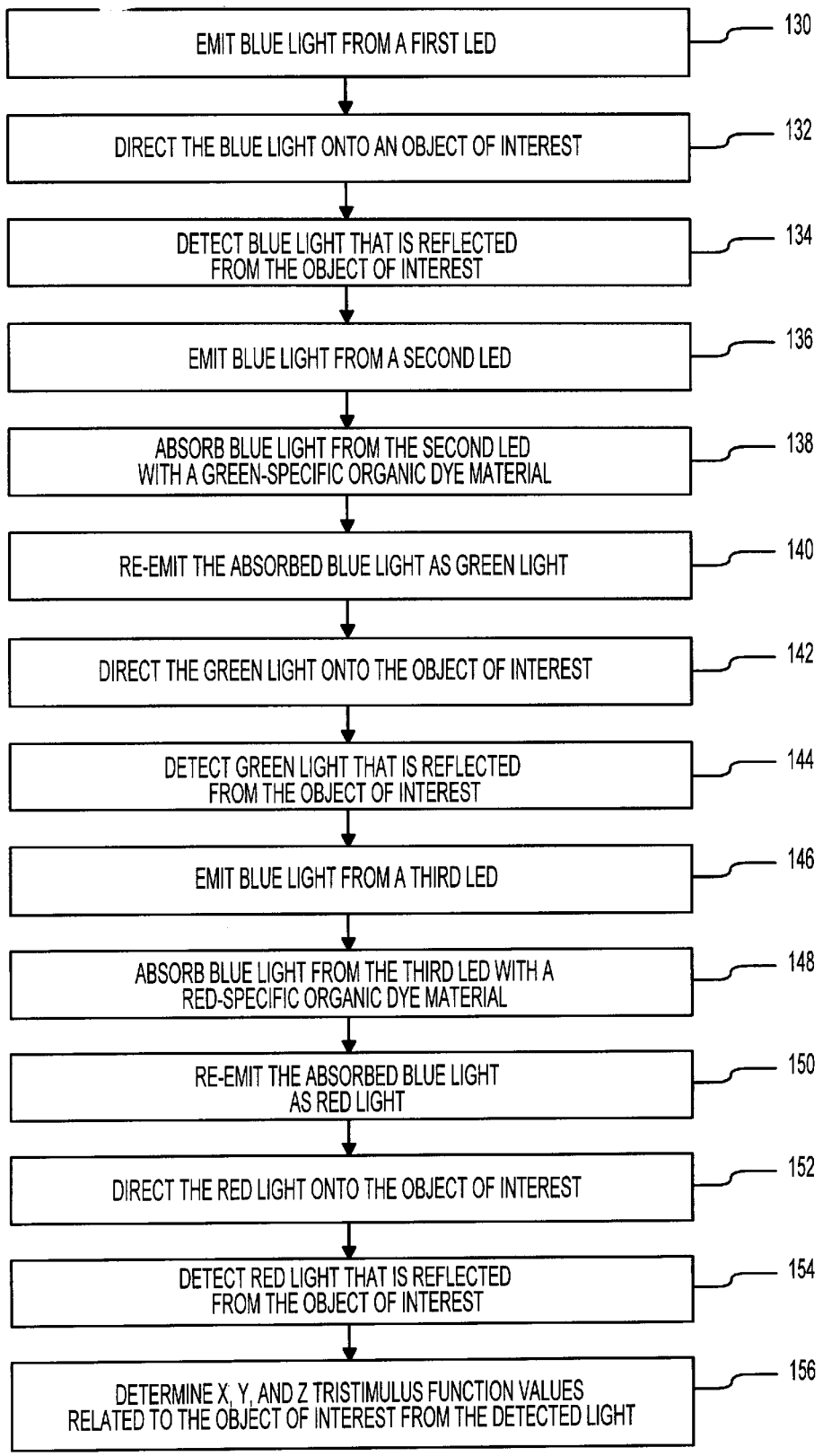
FIG. 8 is a process flow diagram of a method for measuring the color of an object with a light source that corresponds to the X, Y, and Z tristimulus functions in accordance with the invention.

FIG. 8 depicts a process flow diagram of a preferred method for measuring the color or color pattern of an object of interest utilizing lights that simulate the CIE standard X, Y, and Z tristimulus functions in accordance with the invention. In a first step 130, blue light is emitted from a first LED, where the blue light corresponds to the CIE standard Z tristimulus function. In a step 132, the blue light is directed onto the object of interest. In a step 134, blue light reflected from the object of interest is detected. In a step 136, blue light is emitted from a second LED. In a step 138, the blue light emitted from the second LED is absorbed with a green-specific organic dye. In a step 140, the absorbed energy of the blue light from the second LED is re-emitted as green light, where the green light corresponds to the CIE standard Y tristimulus function. In a step 142, the green light is directed onto the object of interest. In a step 144, green light reflected from the object of interest is detected. In a step 146, blue light is emitted from a third LED. In a step 148, the blue light emitted from the third LED is absorbed with a red-specific organic dye material. In a step 150, the absorbed energy of the blue light from the third LED is re-emitted as red light, where the red light corresponds to the X tristimulus function. In a step 152, the red light is directed onto the object of interest. In a step 154, red light reflected from the object of interest is detected. In a step 156, X, Y, and Z tristimulus function values related to the object are determined based on the amounts of light that is detected from the object.

Although the preferred embodiment is described as a three-color light source utilizing only blue emitting LEDs, alternative embodiments of the light source are possible. For example, the light source may only emit light approximating one of the X, Y, or Z tristimulus function curves. Preferably, light shifted to approximate the Y tristimulus function curve (green light) can be used alone to measure the brightness or darkness of an object. In another embodiment, the light source may emit light that approximates two of the X, Y, or Z tristimulus function curves. For example, a two-color light source emitting red and green light can be used to sort items such as red and green apples.

As another alternative, one or more of the light emitters, or LEDs, may emit light with a spectral distribution in the ultraviolet range. Light in the ultraviolet range can then be shifted to match the X, Y, or Z tristimulus function curves. In addition, since red light emitting LEDs are well known, a red light emitting LED may be used to generate light approximating the X tristimulus function in a light source where the blue and/or green light is created by wavelength shifting as described above. In another alternative embodiment, a single light emitter may be used to generate more than one color of light. For example, a single LED may be operatively associated with a first wavelength-shifting medium and a second wavelength-shifting medium, whereby light approximating two of the CIE tristimulus function curves is generated from the single LED.

What is claimed is:

1. A light source for measuring color comprising:
   a first light emitter that emits light having a first spectral distribution, where said first light emitter is operatively associated with a first wavelength-shifting medium that shifts said first spectral distribution of said emitted light to a second spectral distribution, said second spectral distribution being a spectral distribution that approximates a CIE standard tristimulus function.

2. The light source of claim 1 wherein said CIE standard tristimulus function is a CIE standard X tristimulus function.

3. The light source of claim 1 wherein said CIE standard tristimulus function is a CIE standard Y tristimulus function.

4. The light source of claim 1 wherein said CIE standard tristimulus function is a CIE standard Z tristimulus function.

5. The light source of claim 3 further including a photo detector that detects light emitted from said light source and outputs a measure of brightness or darkness.

6. The light source of claim 1 further including a second light emitter that emits light having a third spectral distribution, where said second light emitter is operatively associated with a second wavelength-shifting medium that shifts said third spectral distribution of said emitted light to a fourth spectral distribution, said fourth spectral distribution being a spectral distribution that approximates a CIE standard tristimulus function, wherein said fourth spectral distribution approximates a different CIE standard tristimulus function than said second spectral distribution.

7. The light source of claim 6 further comprising at least one photo detector for measuring light emitted from one of said first and second light emitters.

8. The light source of claim 6 further including a third light emitter that emits light having a fifth spectral distribution, where said third light emitter is operatively associated with a third wavelength-shifting medium that shifts said fifth spectral distribution of said emitted light to a sixth spectral distribution, said sixth spectral distribution being a spectral distribution that approximates a CIE standard tristimulus function, wherein said sixth spectral distribution approximates a different CIE standard tristimulus function than said second spectral distribution and said fourth spectral distribution.

9. The light source of claim 1 wherein said first wavelength-shifting medium includes a first fluorescent material that absorbs said emitted light having said first spectral distribution and re-emits light having said second spectral distribution.

10. The light source of claim 1 wherein said first light emitter is an ultraviolet light emitter.

11. The light source of claim 1 wherein said first light emitter is a blue light emitter.

12. The light source of claim 11 wherein said blue light emitter is a GaN-based semiconductor device.

13. A method for measuring the color of an object utilizing light sources that simulate the CIE standard X, Y, and Z tristimulus functions comprising steps of:
    emitting blue light from a first LED, where said blue light corresponds to said CIE standard Z tristimulus function;
    emitting blue light from a second LED;
    absorbing light energy of said blue light emitted from said second LED with a green-specific non-scattering fluorescent material;
    re-emitting said absorbed light energy of said blue light from said second LED as green light, where said green light corresponds to said CIE standard Y tristimulus function;
    emitting red light from a red light emitter, where said red light corresponds to said CIE standard X tristimulus function;
    directing said blue light from said first LED, said green light from said second LED, and said red light from said red light emitter onto said object; and
    detecting intensities of blue light, green light, and red light reflected from said object.

14. The method of claim 13 wherein said step of emitting red light from a red light emitter includes the steps of:
    emitting blue light from a third LED;
    absorbing light energy of said blue light emitted from said third LED with a red-specific non-scattering fluorescent material; and
    re-emitting said absorbed light energy of said blue light from said third LED as red light.

15. The method of claim 13 wherein said steps of absorbing includes a step of incorporating said green-specific non-scattering fluorescent material into a lens that is attached to said second LED.

16. A calorimeter comprising:
    a first LED that emits blue light;
    a second LED that emits blue light, where said second LED is operatively associated with a green-converting medium that absorbs said blue light emitted from said second LED and emits green light;

a third LED that emits blue light, where said third LED is operatively associated with a red-converting medium that absorbs said blue light from said third LED and emits red light; and means for separately detecting said blue light emitted from said first LED, said green light emitted from said second LED, and said red light emitted from said third LED.

17. The colorimeter of claim 16 wherein said green-converting medium is formed with a first non-scattering fluorescent material.

18. The colorimeter of claim 17 wherein said red-converting medium formed with a second non-scattering fluorescent material.

19. The colorimeter of claim 18 wherein said blue light from said first LED simulates the CIE standard Z tristimulus function, said green light from said second LED and said associated green-converting medium simulates said CIE standard Y tristimulus function, and said red light from said third LED and said associated red-converting medium simulates said CIE standard X tristimulus function.

20. The calorimeter of claim 19 wherein said first, second, and third LEDs are GaN-based semiconductor devices.

* * * * *